United States Patent [19]

Aftergut et al.

[11] 4,315,668
[45] Feb. 16, 1982

[54] PERMEATION BARRIER FOR DISPLAY CELLS

[75] Inventors: Siegfried Aftergut; Erwin C. Buschmann; Kenneth Q. Lao, all of Schenectady, N.Y.

[73] Assignee: General Electric Company, Schenectady, N.Y.

[21] Appl. No.: 207,009

[22] Filed: Nov. 14, 1980

Related U.S. Application Data

[63] Continuation of Ser. No. 17,043, Mar. 2, 1979, abandoned.

[51] Int. Cl.$^3$ .................................................. G02F 1/13
[52] U.S. Cl. ...................................... 350/343; 350/344
[58] Field of Search ................... 350/334, 343, 344; 428/1

[56] References Cited

U.S. PATENT DOCUMENTS 4,135,789  1/1979  Hall ........................................ 350/343
4,148,128  4/1979  Feldman ................................. 350/344
4,165,157  8/1979  Kobale et al. ........................ 350/344

FOREIGN PATENT DOCUMENTS 2555844  6/1977  Fed. Rep. of Germany ...... 350/343

*Primary Examiner*—Bruce C. Anderson
*Attorney, Agent, or Firm*—Geoffrey H. Krauss; James C. Davis, Jr.; Marvin Snyder

[57] ABSTRACT

Cells, such as liquid crystal display cells, having a material contained between a pair of parallel, spaced-apart substrates, are sealed to prevent permeation therein of vapor which is potentially harmful to the material contained within the cell, by reducing the area of relatively high permeation material at the cell boundary and/or by completely enclosing the boundary in a permeation resistant barrier of inorganic material.

4 Claims, 4 Drawing Figures

PERMEATION BARRIER FOR DISPLAY CELLS

This is a continuation of application Ser. No. 017,043, filed Mar. 2, 1979, now abandoned.

BACKGROUND OF THE INVENTION

The present invention relates to permeation barriers for cells and, more particularly, to novel barriers for preventing entry of potentially deleterious vapors into the interior of display cells.

Cells, such as liquid crystal display cells, typically have a material, such as a liquid crystal composition and the like, contained between a pair of substrates, which may be formed of glass and the like materials in display cells, and with the periphery between the pair of spaced-apart substrates sealed by some material preventing egress of the internally-contained (liquid crystal) material from the cell. The sealing material must not only effectively seal the internal material within the cell but must also prevent entry into the cell of external materials which may have a deleterious effect upon the material contained within the cell. Typically, in liquid crystal display cells, the liquid crystal material is adversely affected by entry of water vapor. Accordingly, the material used for sealing the cell must not only keep the liquid crystal material within the cell, but must also prevent permeation of water vapor into the cell.

In the past, liquid crystal cell seals were formed either of glass frit or organic polymers, such as epoxy resins and the like. Sealing materials were generally disposed, in the form of gaskets, about the periphery of the cell. The advantage of a seal of glass frit is known to be that such seal is practically impervious to gas and vapors, but does require formation by high temperature processing which tend to distort the substrates and render difficult, if not impossible, adequately control of the uniformity of the distance between the inner surface of the parallel substrates, which gap (containing the liquid crystal material) must be maintained with a high degree of uniformity for proper operation of a liquid crystal display device. In producing an effective glass frit seal, the frit is generally applied to a surface of one of the substrates as a paste of glass powder particles dispersed in a liquid vehicle. The substrate is subsequently heated over a programmed temperature regime wherein, at lower temperatures, the solvent is evaporated and the binder is burned off, and thence in the higher temperature portions of the regime, the glass powder itself melts and coalesces to form a strongly adhesive bond to the glass substrate. Subsequently, the second glass substrate is positioned over the coalesced frit and the entire assembly is again subjected to a programmed temperature regime during which the temperature is raised within a few tens of degrees of the glazing temperature of the glass frit. At this relatively high temperature, the glass frit wets the second substrate to acquire satisfactory adhesion thereto. It is known that this second heating cycle tends to soften the substrates and cause warpage thereof, with the result that cells, particularly those of large surface area, sealed by this glass frit method tend to have a very low percentage of acceptable manufacture.

It is also known that warpage can be prevented by the use of organic polymer sealants, such as epoxy resins and the like, which are processible at much lower temperatures. Polymer sealants may be screen printed from a solution or dispersion of the polymer in a solvent, or a polymer sheet can be cut into the shape of a gasket which is sandwiched between the substrates to be sealed, and the sandwich is subsequently heated to effect such seal. It is also known to introduce the polymer along the edges of an assembly of two substrates which are kept otherwise separated by interior spacers. However, such organic polymer sealants have a relatively high permeability to water vapor. Under high humidity conditions, water vapor permeates through the organic polymer seal and tends to cause degradation of the liquid crystal material, typically by loss of molecular alignment, with eventual failure of a display device.

In accordance with the foregoing, it is desirable to provide a seal, and method of use thereof, for retaining material between a pair of spaced substrates, as in a liquid crystal display and the like, while providing an extremely low rate of permeation of vapor from the environment external to the cell into the contained material.

BRIEF SUMMARY OF THE INVENTION

In accordance with the invention, a quantity of material is sealed in low-permeation manner between a pair of spaced-apart substrates, by fabricating an end barrier which may be a formation of glass frit material extending only partially across the distance between the inward-facing surfaces of the substrates with the remaining distance occupied by an organic material gasket joined between the frit formation and a substrate surface, or one of a glass frit formation extending only partially across the distance between the substrates and an organic polymer gasket extending completely between the inward-facing surface of the substrates and about the outer periphery thereof, with an additional barrier of inorganic material extending between the inward-facing surfaces of the substrates at least outwardly of the glass frit or organic material gasket. The inorganic material provides a barrier, between the internally-enclosed material of the cell and the external environment, having a relatively low rate of vapor permeation.

In presently preferred embodiments, the inorganic material may be alumina, titania, silica, or a silicate, with a suspension of silica in water being most preferable in terms of cost. The silica suspension is applied by brushing or dipping and is heated to drive off the water solvent and provide a continuous barrier against vapor permeation.

In another preferred embodiment, a glass frit barrier is formed upon an interior-facing surface of one substrate and an organic material barrier is formed upon the interior-facing substrate of the remaining substrate, whereby, when the substrates are aligned in parallel relationship, partial height frit and organic material barriers are combined to provide a barrier completely across the substrate-separation distance of the cell.

Accordingly, it is one object of the present invention to provide novel permeation barriers for sealing material within a cell formed by spaced-apart substrates.

It is another object of the present invention to provide novel methods for forming permeation barriers for cells.

These and other objects of the present invention will become apparent upon consideration of the following detailed description, taken in conjunction of the drawings.

DETAILED DESCRIPTION OF THE INVENTION

Figure 1:
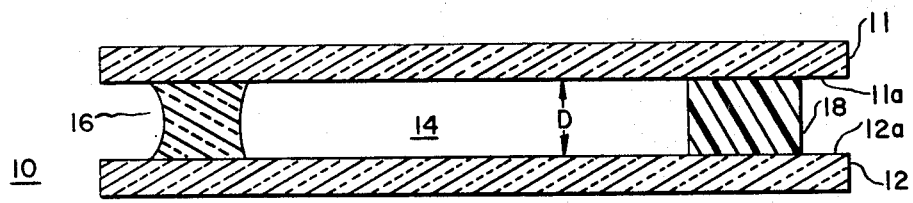
FIG. 1 is a sectional sideview of a cell having prior art seals.

Referring initially to FIG. 1, wherein, shown with exaggerated dimensions, a cell 10 is fabricated with a pair of substrates 11 and 12, typically fabricated of glass in spaced-apart and parallel relationship to one another. The spacing distance D is typically on the order of 0.5 milli-inches. A portion of the volume defined between interior-facing surfaces 11a and 12a of the substrates is filled with a material 14, which may be a liquid crystal composition, if cell 10 is to form a portion of a liquid crystal display device. Internal material 14 is maintained between substrates 11 and 12 by means of a seal formed therebetween and about the periphery of the substrates. One such seal 16 may be formed, in known manner, by glass frit which is applied to one of the interior-facing surfaces, e.g. 12a, by screen printing a paste comprising glass powder particles dispersed in a liquid vehicle. The substrate 12 is heated over a programmed temperature regime with the solvent being evaporated and the binder being burned off in a lower temperature region of the regime. In the higher temperature regions of the regime, the glass powder melts and coalesces to form a strongly adhesive bond to substrate 12. Thereafter, the remaining substrate 11 is positioned over the frit and the assembly is subjected to another programmed temperature regime during which the temperature is raised to within a few tens of degrees of the glazing temperature of the material, e.g., glass frit, forming the barrier 11 and 12. As the glazing temperature is reached, the frit wets the substrate material of the second substrate 11 and flows into adhesion therewith, whereby a seal is formed by the glass frit barrier 16 between the interior-facing surfaces of 11a and 12a of the substrates. At this relatively high temperature, the substrates lose a considerable percentage of their strength and sag and warpage of the substrate may result; unusable cells are thus often provided by using glass frit sealing of large area cells.

It is also known to retain cell material 14 by means of a seal 18 formed of an organic polymer material, such as epoxy resin and the like, which is processible at relatively low temperatures, compared with the temperatures required for processing glass frit seal 16. The polymer material for seal 18 may be screen printed on one substrate interior surface, e.g. surface 12a of substrate 12, with a solution or dispersion of the polymer in a solvent. Alternatively, a sheet of the polymer material may be cut into the form of a gasket which is sandwiched between substrate surfaces 11a and 12a. The sandwich formed by the pair of substrates 11 and 12, maintained in a spaced-apart relationship by the gasket or screen printed quantity of organic polymer material, is then heated to cause the polymer material to adhere to substrate surfaces 11a and 12a. The organic polymer materials have hitherto been characterized by relatively high permeation to water vapor, whereby liquid crystal material 14 may be undesirably degraded and lose a sufficient degree of molecular alignment to cause eventual failure of the device.

Figure 2A:
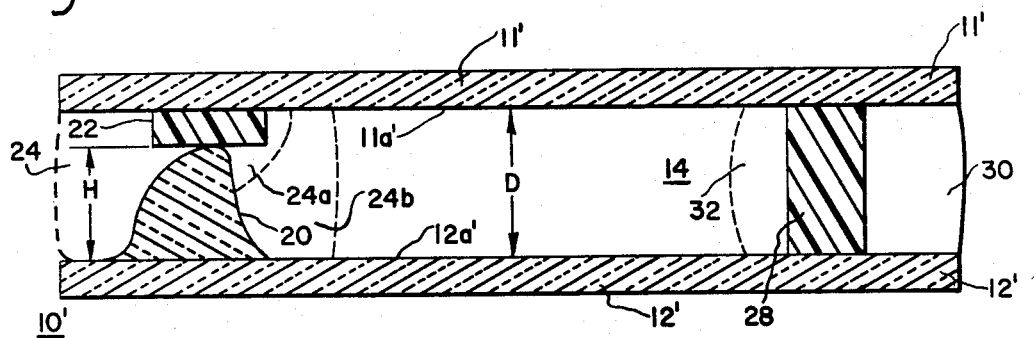
FIGS. 2a, 2b, and 2c are sectional sideviews of cells sealed in accordance with principles of the present invention.

Referring now to FIG. 2a, cell 10', comprising a pair of substrates 11' and 12' positioned in spaced-apart relationship, is provided with a relatively low permeation cell barrier. In one preferred embodiment, a glass frit barrier 20 is formed inwardly of the periphery of, and upon an interior-facing surface 12a' of one substrate 12' of the pair of substrates. The height H of glass frit barrier 20 is less than the desired spacing D between substrate surfaces. To prevent application of temperatures near the substrate material flow temperature, required for prior art glass frit sealing, the remainder of the thickness, between the top of partial frit barrier 20 and the surface 11a' of the opposite substrate, is filled with a polymeric gasket 22. Gasket 22 may be formed of epoxy, acrylic, polyimide, polyester and the like material with solvent, and may be applied to substrate 11a' by spraying, brushing, screenprinting and the like methods. The solvent is then evaporated to form a solvent-free solid partial-height barrier adhering to the interior substrate surface 11a'. The substrates are positioned in parallel alignment and pressed together, such that organic polymer barrier 22 contacts frit barrier 20; heat is applied to soften the polymeric material (which may be chosen to soften at a relatively low temperature, even as low as room temperature) and the softened polymer adheres to the partial-height frit barrier 20 to complete the barrier across the spacing distance D of the cell.

A quantity of inorganic sealing material 24 may be applied between the surfaces of the substrates and external of the barrier formed of frit portion 20 and gasket 22. This low-permeation barrier 24 may be formed of inorganic materials such as silicates, silica, alumina, titania, and the like. Presently preferred is a suspension of silica and water, such as is commercially available as Emulsitone®. The suspension is applied, as by brushing or dipping, about the periphery of the cell and the cell 10' is then heated to vaporize the water and provide a solid inorganic barrier. It should be understood that the inorganic suspension may be applied to one or both of the substrates, prior to placing the substrates in facing relationship, whereby additional inorganic material portions 24a and/or 24b are also provided interior of the first barrier formed by frit 20 and gasket 22, for forming an even thicker permeation barrier. The amount of inorganic material applies adjacent the frit 20 and gasket 22, and on the surfaces thereof towards the interior cavity, is determined by the additional amount of volume which may be taken from the volume of the cell-interior cavity containing the cell material 14.

The inorganic permeation barrier materials may also be utilized with a gasket 28 of organic polymer material, extending completely between the interior facing surfaces of the substrate and which gasket also acts as a spacer. The inorganic material may be applied about the periphery of the cell, as inorganic portion 30, and may also extend into the central cavity, as inorganic sealing portion 32.

Figure 2B:
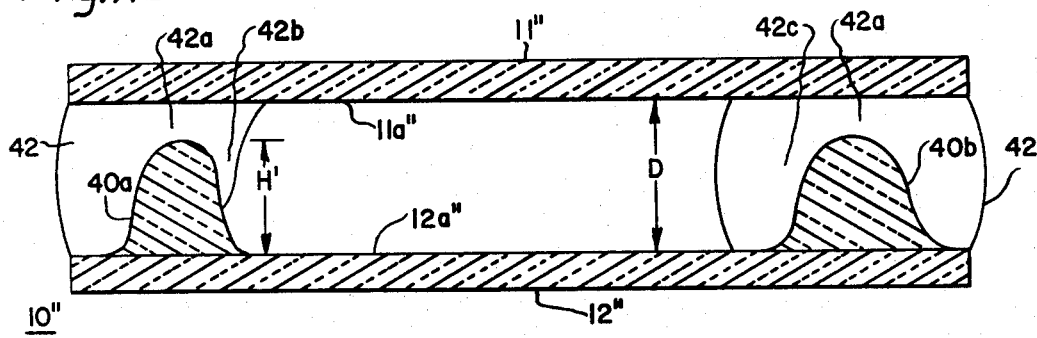

Referring now to FIG. 2b, additional preferred permeation barrier configurations for sealing cell 10'', include the use of glass frit barriers 40a and 40b having a height H', less than the distance D between the facing surfaces of the substrates. The substrates may be held spaced apart from one another by the desired spacing distance D, by supporting a pair of opposed edges of the substrates, while a quantity 42 of the inorganic material is applied between the substrates at the periphery thereof on the remaining, opposed pair of cell sides. Upon heating to remove the binding solvent, the solid inorganic barrier portions 42 of the first opposed pair of sides serves to support the cell while the remaining pair of opposed sides is sealed with additional beads of inorganic sealing material. The beads are applied in sufficient quantity to extend inwardly from the substrate peripheries to form a barrier portion 42a extending at least between the point upon frit portions 40a and 40b furthest from the substrate, e.g. substrate 12'', upon which the partial frit barriers are fabricated, and the nearest point upon the interior surface of the remaining substrate, e.g. substrate 11''. Further permeation protection may be achieved by applying a sufficiently large quantity of the inorganic barrier material to extend even further into the central cavity of the cell, and enclosing either a portion of the frit barrier, as accomplished by additional inorganic sealing portion 42b, extending from the interior surface of substrate 11'' to a point between the base and greatest height H' of frit barrier 40a, or sufficient to completely extend from the interior facing surfaces 11a'' and 12a'', of the substrate, inwardly of the frit barrier 40b. It should be understood that the glass frit barriers 40a and 40b, being essentially vapor impervious, dictate that the only vapor passage be through the inorganic sealant material in barrier portion 42a, which inorganic sealing material is itself of relatively low rate of vapor permeation. Accordingly, the difference between the substrate spacing distance D and the frit barrier height H' is made as small as possible, consistent with the inorganic sealing material utilized. In this manner, a second heating of the substrates, to a temperature close to the flow temperature of the substrates, is prevented when the upper substrate, e.g. substrate 11'', is supported only about the periphery of the cell; sag and warpage are thus prevented while a cell barrier of relatively low rate of permeation is provided.

Figure 2C:
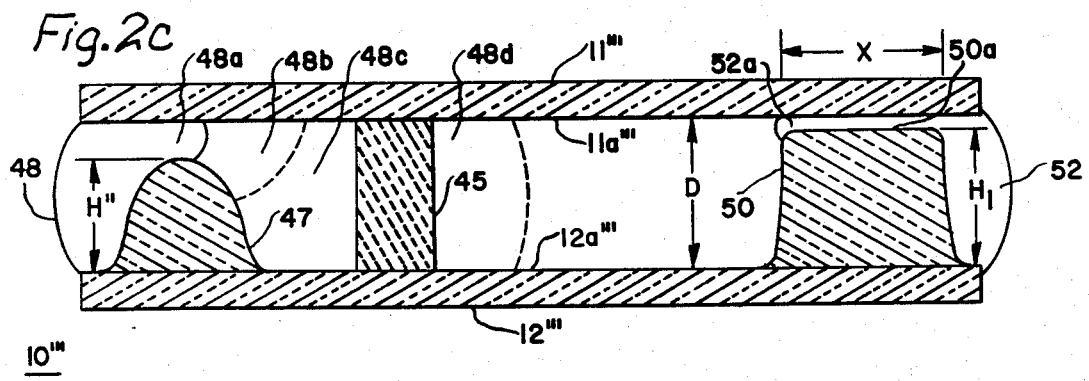

Referring now to FIG. 2c, further preferred permeation barrier configurations for sealing cell 10''' include the use of a spacer 45, of height D equal to the spacing distance D between the spaced-apart substrates 11''' and 12''', which spacer 45 may be formed of glass frit material and utilized for supporting the upper substrate during sealing of the cell about its entire periphery in one continuous operation. A glass frit barrier 47 of height H'', less than spacing distance D, extends partially across the space between the interior surfaces of the substrates, as in the embodiments of FIG. 2b. The inorganic sealant material, in suspension with its binder, is applied at least outwardly of partial frit barrier 47 and extends inwardly from the substrate periphery to have a portion 48a at least contained between the closest spaced portions of the frit barrier 47 and the interior surface 11a''' of the upper substrate. The quantity of inorganic sealing material may be enlarged to provide an additional sealing portion 48b extending from the interior surface 11a''' of the upper substrate to a portion of the interior surface of frit barrier 47 between the base and the highest portion thereof and may also be further increased to include enough inorganic sealing material to form additional portion 48c completely extending inwardly of the partial-height frit barrier to the exterior surface of spacer 45, if spacer 45 is formed of a continuous barrier inwardly of the periphery of the substrates. In such case, an even larger quantity of inorganic sealing material may be so positioned as to form another portion 48d of the permeation barrier extending between the interior surfaces of the substrates and inwardly of the interior surface of the spacer 45.

Even if additional portions 48b, 48c and 48d of the inorganic sealing material are not utilized, a permeation barrier of increased effectiveness may be provided by utilization of spacers with a partial-height glass frit barrier, of height $H_1$, very slightly less than the desired spacing distance D, and with the barrier having relatively great thickness dimension X, whereby the inorganic sealing material is applied as an exterior portion 52 having an extension 52a between the interior top substrate surface 11a''' and the surface of the broad frit barrier top 50a. The unusually long permeation path, of very shallow depth (where the depth is the difference between spacing dimension D and barrier height $H_1$) provides a very effective barrier to permeation of vapor into the interior compartment of cell 10'''.

While several presently preferred embodiments of the present invention are described herein, many variations and modifications will now occur to those skilled in the art. It is our intent, therefore, to be limited only by the scope of the appending claims and not by the specific embodiments described herein.

What is claimed is:

1. A cell for containing a material, comprising:
  first and second substrates each having a surface maintained in spaced-apart relationship with the surface of the remaining substrate;
  a first barrier of an inorganic material, said first barrier being fabricated upon and adhering only to the surface of said first substrate and extending toward said second substrate at least partially but less than completely across the distance separating the facing surfaces of said first and second substrates, inwardly of and substantially continually about the periphery of said substrates;
  said first barrier and said first and second substrates defining the cavity of said cell;
  a quantity of material contained within said cell; and
  a second barrier extending between the surface of said second substrate facing said first substrate and that portion of said first barrier closes to said second substrate, said second barrier formed on an organic material;
  the inorganic material of said first barrier having a low rate of permeation to vapors harmful to the material in said cavity.

2. The cell as set forth in claim 1, further comprising an additional barrier, formed of an inorganic material, extending completely between the facing surfaces of said substrates and at least exterior of said first and second barriers.

3. The cell is set forth in claim 2, wherein said additional barrier also extends between the interior surface of said second substrate and the interior surfaces of said second barrier and at least a portion of said first barrier.

4. The cell as set forth in claim 2 or 3, wherein said additional barrier material is selected from the group consisting of a silicate, silica, titania and alumina.

* * * * *